March 8, 1938. W. DRESE 2,110,328
APPARATUS FOR MEASURING AND FILLING QUANTITIES OF
SEMILIQUIDS, DOUGH, OR SIMILAR FLUENT MATERIAL
Filed June 15, 1937
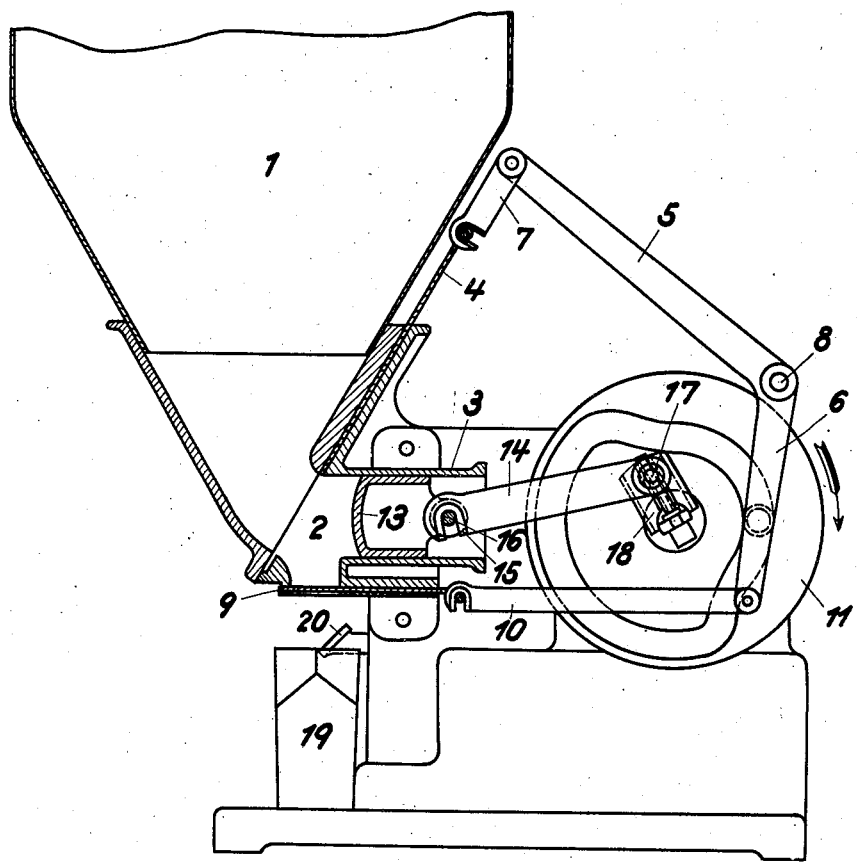
Inventor
Wilhelm Drese Patented Mar. 8, 1938

2,110,328

UNITED STATES PATENT OFFICE 2,110,328

APPARATUS FOR MEASURING AND FILLING QUANTITIES OF SEMILIQUIDS, DOUGH, OR SIMILAR FLUENT MATERIAL

Wilhelm Drese, Dusseldorf, Germany

Application June 15, 1937, Serial No. 148,378
In Germany June 18, 1936

8 Claims. (Cl. 221—102)

The invention relates to an apparatus for measuring and filling quantities of semi-liquids, dough, or similar fluent material like soft cheese or tooth paste.

One object of the invention is to create a reliable apparatus for filling the mentioned materials in packages for the retail sale. It is furthermore an aim of the invention to enable a quick dismantling for the purpose of cleaning and an easy fitting together again.

A preferred embodiment of the invention is illustrated in the accompanying drawing.

In the illustrated apparatus a funnel 1 is arranged in connection with a measuring chamber 2 of the cylinder 3 fixed to a suitable frame. The measuring chamber 2 can be separated from the filling funnel 1 by a slide 4 moving up and down in an inclined direction. The operation of the slide valve 4 takes place by means of the angle lever 5, 6 being connected with the slides by the link 7 and being supported pivotably on the shaft 8. The horizontal slide 9 closing the outlet of the cylinder 3 is connected with the arm 6 of the angle lever 5, 6 by the link 10. The angle lever 5, 6 is actuated by the cam 11 moving in the direction of the arrow. This cam is fixed to a shaft rotatably arranged in bearings on the frame of the apparatus. The mentioned shaft may be driven in any suitable manner, for instance by an electric motor or by belt. It is advantageous to intercalate a single revolution clutch between the drive and the belt. It is not necessary to describe such a clutch, because any of the well known single revolution clutches may be arranged on the shaft. The mentioned single revolution clutch is started by operating the lever 20.

The mentioned cam 11 serves also as disc crank for the plunger 13. The connection between the plunger and the disc crank is performed by a connecting rod 14, the open head of which grips easily detachable over the plunger bolt 16. The slides 4 and 9 are also connected detachably with their links 7 and 10 in the same way. Instead of the rods with open heads also other easily detachable connections can be employed, such as socket pins or the like.

The gudgeon 17 of the crank 18 is adjustable in a known manner for adjusting the stroke of the plunger 13.

The working method is as follows:

The material to be measured and filled—e. g., soft cheese—is stored in the funnel 1. As soon as the empty container 19 has been placed below the outlet of the cylinder 3 the device is started by pressing the starting lever 20. By this the cam 11 moves in the direction of the arrow, the plunger 13 moves to the right, and since the slide 4 is in an open position and the slide 9 in a closed position, the plunger sucks a quantity of soft cheese out of the filling funnel 1 into the measuring chamber 2. As soon as this chamber is filled the slide 4 closes the opening between the compartments 1 and 2. The slide 9 opens the outlet of the cylinder 3, and the plunger 13 presses the soft cheese out of the measuring device into the open container placed below, whereupon the device stops, and after declutching the coupling the new working operation is started.

What I claim as my invention and desire to secure by Letters Patent, is:

1. An apparatus for measuring and filling quantities of semi-liquids, dough or like fluent material comprising a measuring chamber, a plunger or piston arranged in said measuring chamber, slide valves for closing the inlet and outlet of said measuring chamber, and a single disc shaped as a disc crank for reciprocating said plunger or piston and as a cam for driving said slide valves.

2. In an apparatus according to claim 1, the fact that those ends of said piston and of said slide valves, which are connected with the links of the drive, are arranged at the same side of the apparatus.

3. An apparatus according to claim 1 having two slide valves operated by a two-armed lever, every arm of which is connected with a single slide valve.

4. An apparatus for measuring and filling quantities of semi-liquids, dough or like fluent material comprising a measuring chamber, a plunger or piston arranged in said measuring chamber, a crank drive for reciprocating said plunger or piston, slide valves for closing the inlet and outlet of said measuring chamber, a cam drive for operating said slide valves, and easily detachable means for connecting the slide valves with the cam drive and the plunger or piston with the crank drive; said easily detachable means consisting in connecting rods provided at their heads with open slots arranged transverse to the longitudinal extension of said connecting rods.

5. An apparatus for measuring and filling quantities of semi-liquids, dough or like fluent material comprising a measuring chamber, a plunger or piston arranged in said measuring chamber, slide valves for closing the inlet and outlet of said measuring chamber, a single disc shaped as a disc crank for reciprocating said plunger or piston and as a cam for driving said slide valves, and connecting rods provided with open heads linked to said piston and to said slide valves.

6. An apparatus for measuring and filling quantities of semi-liquids, dough, or like fluent material, comprising a receptacle for the material, a measuring chamber having communication with the receptacle, a slide valve cut-off for the communication between the receptacle and measuring chamber, the measuring chamber being formed with an outlet for delivery of the measured amount of material from the measuring chamber, a slide valve cut-off for the outlet, a plunger operative in the measuring chamber and serving in movement in one direction to draw material from the container into the measuring chamber and in movement in the opposite direction to force material from the measuring chamber through the outlet, means for alternately operating the slide valve cut-offs, said means including an angle lever, a connection between one end of the angle lever and one of said slide valve cut-offs and a connection between the opposite end of the angle lever and the other slide valve cut-off, means for operating the plunger, and a single rotating element for operating the angle lever and its connections to the slide valve cut-offs and for operating the plunger.

7. A construction as defined in claim 6, wherein the single operating element is formed in part as a cam for operating the angle lever and in part as a crank for operating the plunger.

8. A construction as defined in claim 6, wherein the connections between the slide valve cut-offs and their operating means and between the plunger and its operating means are arranged for quick detachment from the respective parts to simplify assemblage or dismantling.

WILHELM DRESE.